United States Patent
Tsutsui et al.

(10) Patent No.: US 10,128,486 B2
(45) Date of Patent: Nov. 13, 2018

(54) CURRENT INTERRUPT DEVICES, METHODS THEREOF, AND BATTERY ASSEMBLIES MANUFACTURED THEREWITH

(71) Applicant: PURDUE RESEARCH FOUNDATION, West Lafayette, IN (US)

(72) Inventors: Waterloo Tsutsui, West Lafayette, IN (US); Hangjie Liao, West Lafayette, IN (US); Thomas Heinrich Siegmund, West Lafayette, IN (US); Weinong Wayne Chen, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 298 days.

(21) Appl. No.: 15/069,545

(22) Filed: Mar. 14, 2016

(65) Prior Publication Data
US 2016/0268584 A1    Sep. 15, 2016

Related U.S. Application Data

(60) Provisional application No. 62/132,630, filed on Mar. 13, 2015.

(51) Int. Cl.
| | |
|---|---|
| *H01M 2/34* | (2006.01) |
| *H01M 2/30* | (2006.01) |
| *H01M 2/20* | (2006.01) |
| *H01M 2/10* | (2006.01) |

(52) U.S. Cl.
CPC ......... *H01M 2/347* (2013.01); *H01M 2/1077* (2013.01); *H01M 2/206* (2013.01); *H01M 2/305* (2013.01); *H01M 2200/20* (2013.01); *H01M 2220/20* (2013.01)

(58) Field of Classification Search
CPC ......... H01M 2200/20; H01M 2220/20; H01M 2200/00; H01M 2/34; H01M 2/345; H01M 2/347
See application file for complete search history.

(56) References Cited

U.S. PATENT DOCUMENTS

| | | |
|---|---|---|
| 4,025,696 A | 5/1977 | Tucholski et al. |
| 4,028,478 A | 6/1977 | Tucholski |
| 4,035,552 A | 7/1977 | Epstein |

(Continued)

OTHER PUBLICATIONS

Weerasooriya et al., Dynamic Behavior of Materials, vol. 1, Conference Proceedings of the Society for Experimental Mechanics Series 99, DOI 10.1007/978-1-4614-0216-9_9, 2011.

(Continued)

*Primary Examiner* — Imran Akram
(74) *Attorney, Agent, or Firm* — Hartman Global IP Law; Gary M. Hartman; Domenica N. S. Hartman

(57) ABSTRACT

A current interrupt device, method thereof, and battery assembly suitable for reducing the likelihood of an overcharge of the battery. The battery assembly includes a busbar electrically connecting an anode of a first battery cell and a cathode of a second battery cell of the battery assembly. The busbar is configured to interrupt the flow of electrical current between the anode and cathode in response to a mechanical impact load, for example an automobile crash.

13 Claims, 4 Drawing Sheets

(56) References Cited

U.S. PATENT DOCUMENTS

| | | | |
|---|---|---|---|
| 4,156,552 A * | 5/1979 | Wilson | H01M 2/202 439/281 |
| 4,178,225 A | 12/1979 | Ruthel et al. | |
| 4,359,377 A | 11/1982 | Blanc et al. | |
| 4,396,483 A | 8/1983 | Schmidt-Hatting | |
| 4,474,611 A | 10/1984 | Blanc et al. | |
| 4,507,368 A | 3/1985 | Hashimoto | |
| 4,855,195 A | 8/1989 | Georgopoulos et al. | |
| 4,943,497 A | 7/1990 | Oishi et al. | |
| 4,971,867 A | 11/1990 | Watanabe et al. | |
| 4,975,341 A | 12/1990 | Tucholski et al. | |
| 4,992,339 A | 2/1991 | Georgopoulos | |
| 4,992,344 A | 2/1991 | Coppers | |
| 5,026,615 A | 6/1991 | Tucholski | |
| 5,057,382 A | 10/1991 | Tucholski | |
| 5,137,612 A | 8/1992 | Romine et al. | |
| 5,171,648 A | 12/1992 | Beard | |
| 5,188,909 A | 2/1993 | Pedicini | |
| 5,227,267 A | 7/1993 | Goebel et al. | |
| 5,418,082 A | 5/1995 | Taki et al. | |
| 5,427,875 A | 6/1995 | Yamamoto et al. | |
| 5,464,705 A | 11/1995 | Wainwright | |
| 5,523,178 A | 6/1996 | Murakami et al. | |
| 5,741,606 A | 4/1998 | Mayer et al. | |
| 5,747,187 A | 5/1998 | Byon | |
| 5,853,912 A | 12/1998 | Naing et al. | |
| 5,879,832 A | 3/1999 | Vu et al. | |
| 5,998,051 A | 12/1999 | Poirier et al. | |
| 6,131,798 A | 10/2000 | Prengaman | |
| 6,242,126 B1 | 6/2001 | Mori et al. | |
| 6,258,477 B1 | 7/2001 | Kashihara et al. | |
| 6,322,921 B1 | 11/2001 | Iwaizono et al. | |
| 6,388,424 B1 | 5/2002 | Hidaka et al. | |
| 6,440,599 B1 | 8/2002 | Takada et al. | |
| 6,524,739 B1 | 2/2003 | Iwaizono et al. | |
| 6,570,749 B1 | 5/2003 | Ling et al. | |
| 6,713,210 B1 | 3/2004 | Sato et al. | |
| 6,730,431 B2 | 5/2004 | Romero | |
| 6,878,481 B2 | 4/2005 | Bushong et al. | |
| 7,175,935 B2 | 2/2007 | Welsh | |
| 7,244,527 B2 | 7/2007 | Klein | |
| 8,257,855 B2 | 9/2012 | Ijaz et al. | |
| 2005/0181272 A1 | 8/2005 | Kim | |
| 2006/0073375 A1 | 4/2006 | Hong et al. | |
| 2007/0099034 A1 | 5/2007 | Barrella | |
| 2008/0008928 A1 | 1/2008 | Partin et al. | |
| 2008/0289945 A1 * | 11/2008 | Brazier | H01M 2/1229 200/83 R |
| 2009/0029193 A1 * | 1/2009 | Onnerud | H01M 2/1235 429/7 |
| 2009/0280669 A1 | 11/2009 | Chen et al. | |
| 2010/0167116 A1 * | 7/2010 | Okada | H01M 2/1077 429/158 |
| 2010/0247997 A1 | 9/2010 | Hostler et al. | |
| 2010/0247998 A1 | 9/2010 | Hostler et al. | |
| 2010/0248010 A1 * | 9/2010 | Butt | H01M 10/0468 429/160 |
| 2010/0255351 A1 | 10/2010 | Ijaz et al. | |
| 2011/0073345 A1 | 3/2011 | Sato et al. | |
| 2012/0114979 A1 * | 5/2012 | Kim | H01M 2/1241 429/7 |
| 2012/0114986 A1 * | 5/2012 | Kim | H01M 2/0217 429/53 |
| 2012/0288743 A1 | 11/2012 | McLaughlin et al. | |
| 2012/0315807 A1 | 12/2012 | Sakae | |
| 2013/0012079 A1 | 1/2013 | Sakae et al. | |
| 2013/0017421 A1 * | 1/2013 | Onnerud | B60R 21/01 429/61 |
| 2013/0236752 A1 * | 9/2013 | Yang | H01M 2/30 429/61 |
| 2013/0306369 A1 | 11/2013 | Li et al. | |
| 2014/0062418 A1 * | 3/2014 | Lim | H02J 7/0031 320/137 |
| 2014/0065467 A1 * | 3/2014 | Choi | H01M 2/30 429/158 |
| 2015/0140393 A1 * | 5/2015 | Yamamoto | H01M 2/1077 429/121 |
| 2015/0207126 A1 * | 7/2015 | Chorian | B60L 11/1877 429/99 |

OTHER PUBLICATIONS

Tsutsui et al., Quasistatic and dynamic mechanical responses of load-bearing structural batteries for electric vehicles, Poster Presentatien, Oct. 1-3, 2014.

Dudaney et al., Dynamic Analysis of Granular Battery Assembly (GBA), Oral Presentation, Aug. 7, 2014.

* cited by examiner

CURRENT INTERRUPT DEVICES, METHODS THEREOF, AND BATTERY ASSEMBLIES MANUFACTURED THEREWITH

CROSS REFERENCE TO RELATED APPLICATIONS

This application claims the benefit of U.S. Provisional Application No. 62/132,630, filed Mar. 13, 2015, the contents of which are incorporated herein by reference.

BACKGROUND OF THE INVENTION

The present invention generally relates to batteries and their uses. The invention particularly relates to an integrated current interrupt device for interrupting current within a battery in the event of a mechanical impact load.

Currently, the automotive industry is facing increased pressure from consumer demand for more fuel-efficient vehicles. To meet these requirements, as well as new regulations enforced by the Environmental Protection Agency, automotive manufactures have increasingly relied on battery power for automobile power. Unfortunately, the cost of manufacturing batteries is still relatively high, each additional battery increases the risk of an overcharge, and there are risks of explosions during accidents that have not yet been completely preventable. As such, industry is continuously attempting to both reduce the cost of manufacturing car batteries and improve their safety.

To improve upon safety, modern batteries generally comprise safety devices integrated in the cell design for overcharge and short-circuit protection. One type of safety device is an integrated current interrupt device (CID), which electrically disconnects the cell if internal pressures get too high. For battery cells with hard shell batteries (i.e., cylindrical and prismatic cells), the individual battery cells may have CID functionality for internal short circuits. Softer shell batteries (i.e., pouch cells) generally do not have CID functionality since the currently-accepted assumption in the battery industry is for the pouch/bag to simply open under high internal pressure inside the pouch. However, in the automotive industry, for instance, large numbers of battery cells are commonly constrained in the thickness direction thereof, and therefore the pouch cells may not be capable of opening freely as assumed. It is believed that no CID functionality is currently provided to any type of battery for mechanical impact loads.

Accordingly, there is an ongoing desire for methods or devices by which CID functionality may be provided to battery cells that interrupt current in the event of mechanical impact loads, for example, during an automobile accident.

BRIEF DESCRIPTION OF THE INVENTION

The present invention provides current interrupt devices, methods thereof, and battery assemblies manufactured therewith suitable for interrupting current flow between battery cells in response to a mechanical impact loading event, such as may occur during an automobile accident.

According to one aspect of the invention, a battery assembly includes at least two battery cells each comprising an anode terminal and a cathode terminal, and a busbar electrically connecting the anode terminal of a first of the at least two battery cells and the cathode terminal of a second of the at least two battery cells. The busbar is configured to interrupt the flow of electrical current between the anode terminal of the first battery cell and the cathode terminal of the second battery cell in response to a mechanical impact load.

According to another aspect of the invention, a method of reducing the likelihood of an overcharge of a battery assembly having at least two battery cells includes providing a busbar that electrically connects an anode of a first of the at least two battery cells and a cathode of a second of the at least two battery cells. In the event of a mechanical impact load on the battery assembly, the busbar interrupts the flow of electrical current between the anode of the first battery cell and the cathode of the second battery cell in response to the mechanical impact load.

According to another aspect of the invention, a current interrupt device for use in a battery assembly having at least two battery cells includes a busbar configured to electrically connect an anode terminal of a first of the at least two battery cells and a cathode terminal of a second of the at least two battery cells. The busbar is also configured to interrupt the flow of electrical current between the anode terminal of the first battery cell and the cathode terminal of the second battery cell in response to a mechanical impact load.

Technical effects of the battery assembly, current interrupt device, and methods thereof described above preferably include the capability of improving the safety of battery assemblies by physically disconnecting electric connections between battery cells under mechanical impact load at a busbar, thus preventing or reducing the likelihood of an overcharge.

Other aspects and advantages of this invention will be better appreciated from the following detailed description.

DETAILED DESCRIPTION OF THE INVENTION

The present invention provides methods suitable for providing battery cells with current interrupt device (CID) functionality to interrupt current in the event of a sufficiently great mechanical impact load, for example, as may occur during an automobile accident. Batteries in accordance with aspects of the present invention include one or more busbars (bus bars) that function for both electricity transmission and as a CID. As such, the present invention provides CIDs, methods of using the CIDs, and batteries manufactured with the CIDs.

Figure 1:
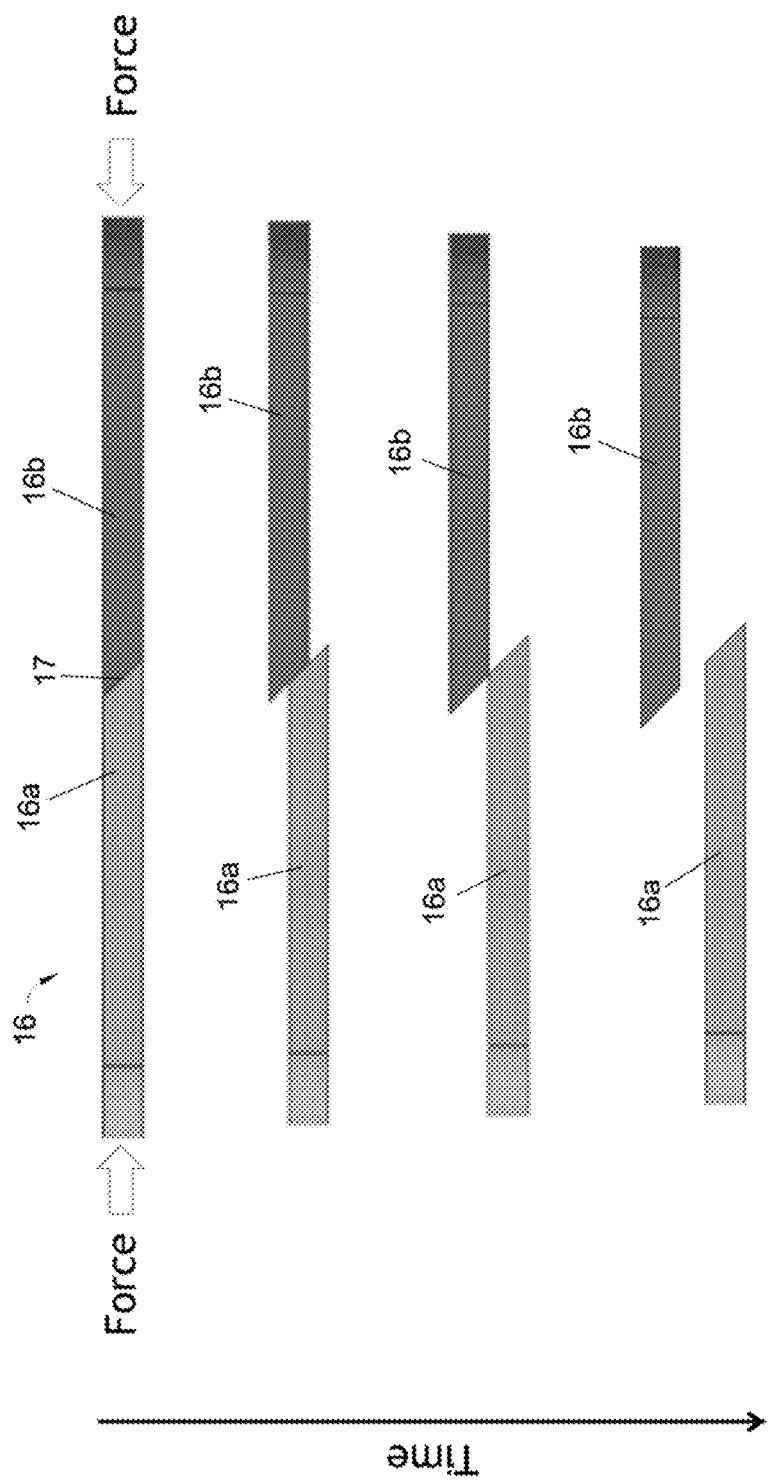
FIG. 1 schematically represents a nonlimiting example of a busbar prior to, during, and after an impact mechanical loading event wherein mechanical forces acting upon the busbar over time cause sections of the busbar to separate and break contact in accordance with certain aspects of the invention.

A busbar is generally a strip or bar of metal that conducts electricity within a switchboard, distribution board, substation, battery bank, or other electrical apparatus. During normal operation of batteries of the types described herein, busbars connect individual battery cells and function as simple busbars, that is, conduct electricity between anode and cathode terminals of the battery cells. However, under impact mechanical loading conditions, such as vehicle crash events, the busbars are configured to break or sever the electrical connection in a manner that prevents current flow and prevents or at least reduces the likelihood of a battery overcharge and explosion. For example, FIG. 1 represents a nonlimiting busbar prior to (top image), during (two middle images), and after (bottom image) an impact mechanical loading event. As represented, mechanical forces acting upon the busbar over time cause sections of the busbar to separate and break contact. Consequently, the busbar will preferably interrupt the flow of current between individual battery cells and thereby function as a CID. Therefore, busbars as described herein preferably provide both electricity transmission and current interrupt functionality. The busbar 16 in FIG. 1 is represented as two cladded metal components 16a and 16b that are substantially coplanar and bonded together at a continuous and planar interface 17 disposed at an oblique angle to the plane of the busbar such that, upon mechanical impact loading, the two metal components are displaced in opposite directions out of the plane of the bus bar.

The busbars may be formed of any materials suitable for conducting electricity between battery cells and whose cladded metal components are capable of being bonded together. As a nonlimiting example, the cladded metal components of a busbar may be formed of a cladded metal, for example aluminum and copper. It is believed that such an arrangement may significantly reduce the cost of assembly of the batteries since the aluminum and copper ends of the components can be metallurgically joined (e.g., soldered or welded) directly to the cathode (positive, aluminum) and anodes (negative, copper) battery terminals, respectively, without the use of machine screws that are typically used in battery assembly.

The busbars may have any structure suitable for conducting electricity between individual battery cells during normal operation, and for interrupting such electrical conduction during a mechanical impact loading event. As a nonlimiting example, a battery assembly may include a busbar electrically connecting an anode of a first battery cell and a cathode of a second battery cell. In such a configuration, the busbar is preferably configured to interrupt the flow of electrical current between the anode and cathode in response to a mechanical impact load.

Figure 2:
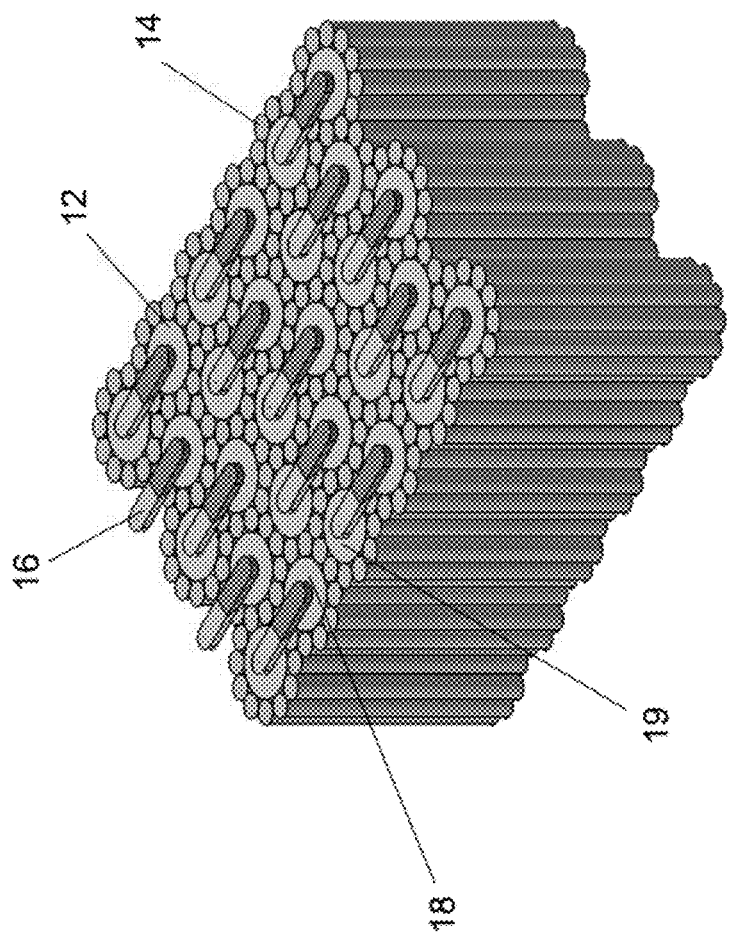
FIG. 2 is a perspective view of a nonlimiting granular battery assembly having anodes and cathodes of individual battery cells electrically connected by busbars in accordance with certain aspects of the invention.
Figure 3:
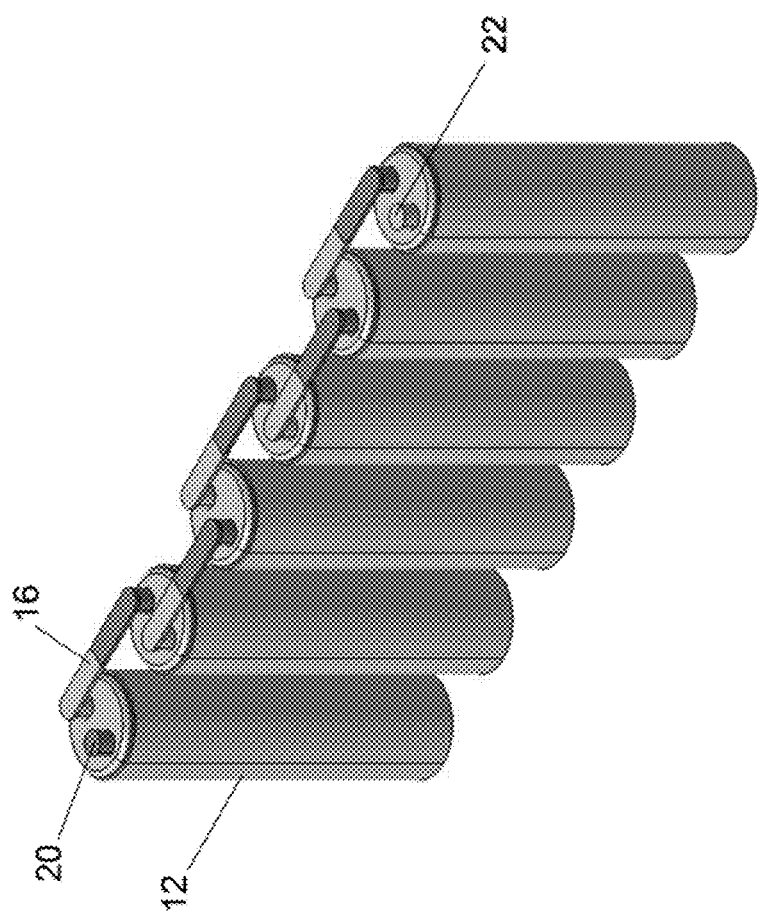
FIG. 3 is a perspective view representing cylindrical battery cells having anodes and cathodes thereof electrically connected by busbars in accordance with certain aspects of the invention.

Busbars as described herein may be used with any type of battery. For example, FIG. 2 represents a granular battery assembly (GBA) comprising a plurality of cylindrical battery cells 12, each individually surrounded by a deformation unit 14. The deformation units 14 are capable of being deformed and hence absorb kinetic energy in the event of an impact loading. GBAs and components of the type represented in FIG. 2 are disclosed in U.S. Patent Application Publication No. 2015/0155534 to Tsutsui et al., the contents of which are incorporated herein. The GBA includes busbars 16 that are of the type represented in FIG. 1 and electrically connect individual battery cells 12 of the GBA. In this arrangement, each of the individual battery cells 12 includes an anode terminal on a first end thereof and a cathode terminal on a second end thereof. The orientation of the battery cells 12 alternate between adjacent battery cells 12 such that busbars 16 may connect the battery cells 12 in series. Therefore, although not shown, the battery cells 12 in FIG. 2 that appear to be electrically separate are connected by busbars 16 on lower ends (not shown) of the battery cells 12. For example, a first cell 18 includes a cathode on a lower end thereof that is connected by a busbar 16 to an anode on a lower end of a second cell 19. FIG. 3 represents an alternative arrangement wherein the individual battery cells 12 each include an anode terminal 20 and a cathode terminal 22 on the same end of the battery cell 12, and the busbars 16 electrically connect each of the battery cells 12 by their anode and cathode terminals 20 and 22 in series. Preferably, in the event of a mechanical impact load on the GBA, the busbars 16 separate and interrupt the flow of electrical current between the anodes and cathodes of the adjacent battery cells 12 in response to the mechanical impact load, for example, in the manner described in reference to FIG. 1.

Figure 4:
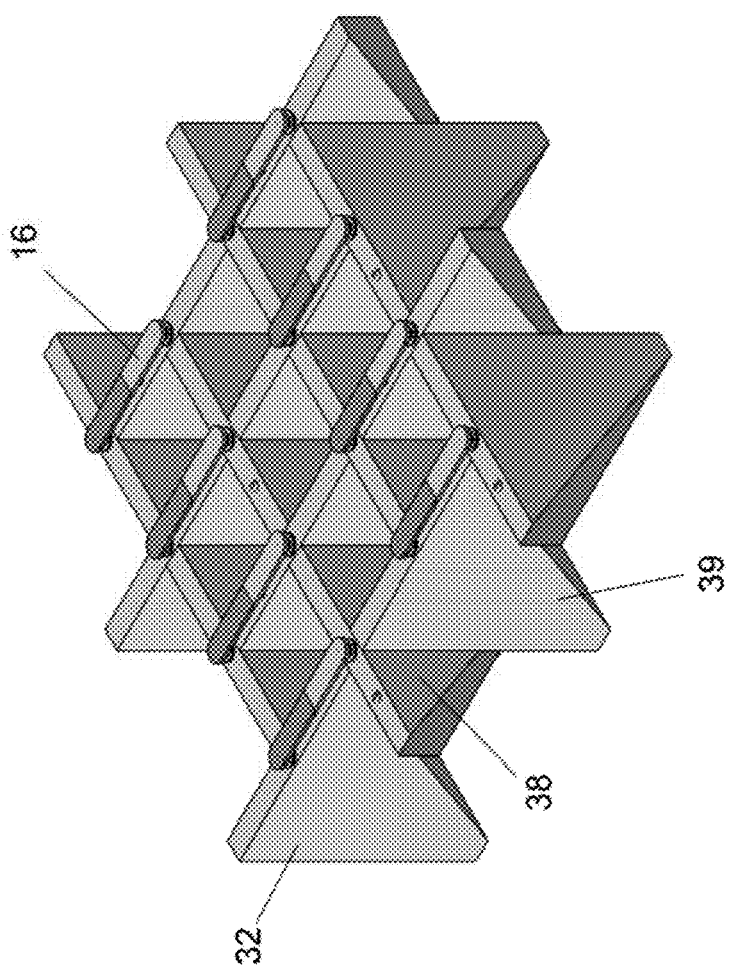
FIG. 4 is a perspective view of a nonlimiting topologically interlocked battery assembly having anodes and cathodes of individual battery cells electrically connected by busbars in accordance with certain aspects of the invention.

As another nonlimiting example, FIG. 4 represents a topologically interlocked battery assembly (TIBA) comprising a plurality of truncated tetrahedron-shaped battery cells 32. In this arrangement, each battery cell 32 is supported by adjacent battery cells 32. Such TIBAs and their components are disclosed in U.S. Patent Application Publication No. 2015/0155534 to Tsutsui et al., the contents of which are incorporated herein. Similar to the battery assembly represented in FIG. 2, each of the individual battery cells 32 includes an anode terminal on a first end thereof and a cathode terminal on a second end thereof. The orientation of the battery cells 32 alternate between adjacent battery cells 32 such that busbars 16 may connect the battery cells 32 in series. Therefore, although not shown, the battery cells 32 in FIG. 4 that appear to be electrically separate are connected by busbars 16 on lower ends (not shown) of the battery cells 32. For example, a first cell 38 includes an anode on a lower end thereof that is connected by a busbar 16 to a cathode on a lower end of a second cell 39. Preferably, in the event of a mechanical impact load on the TIBA, the busbars 16 separate and interrupt the flow of electrical current between the anodes and cathodes of the adjacent battery cells 32 in response to the mechanical impact load, for example, in the manner described in reference to FIG. 1.

In view of the above, it can be seen that a significant advantage of this invention is that the safety of batteries may be improved by introducing CIDs in accordance with aspects of this invention since the electric connections of multiple battery cells under mechanical impact load can be physically disconnected at the busbar, thus preventing or reducing the likelihood of an overcharge. Furthermore, the manufacturing and material costs of the batteries may be reduced if a cladded metal, such as aluminum and copper, is used since connecting screws between busbars and batteries may be eliminated by the use of welding or soldering processes.

It will be understood that batteries in accordance with aspects of the present invention, in addition to the mechanical impact/shock loading CID functionality, may include conventional CID functionality for internal short circuits. A nonlimiting example of a CID for an internal short circuit is disclosed in U.S. Pat. No. 8,945,740 to Fuhr et al., the contents of which are incorporated herein by reference. It is also foreseeable that batteries in accordance with the present invention are applicable to devices other than motor vehicles.

While the invention has been described in terms of specific embodiments, it is apparent that other forms could be adopted by one skilled in the art. For example, the physical configuration of the battery assemblies, battery cells, and/or busbars could differ from that shown, and materials and processes/methods other than those noted could be used. Therefore, the scope of the invention is to be limited only by the following claims.

The invention claimed is:

1. A battery assembly comprising:
    at least two battery cells each comprising an anode terminal and a cathode terminal; and
    a busbar electrically connecting the anode terminal of a first of the at least two battery cells and the cathode terminal of a second of the at least two battery cells to enable electrical current to flow between the anode terminal of the first battery cell and the cathode terminal of the second battery cell, the busbar comprising a planar portion that lies in a plane and comprises first and second cladded components that are coplanar and have respective ends that are bonded together at a continuous interface formed by and between the first and second cladded components, the continuous interface being configured such that, upon a mechanical impact loading on the busbar, the ends of the first and second cladded components are displaced in opposite first and second directions, respectively, out of the plane of the busbar to interrupt the flow of electrical current between the anode terminal of the first battery cell and the cathode terminal of the second battery cell,
    wherein the first cladded component is an aluminum cladded component metallurgically bonded to the anode terminal, the second cladded component is a copper cladded component metallurgically bonded to the cathode terminal, the continuous interface is planar and disposed at an oblique angle to the plane of the busbar, and the oblique angle causes the first and second cladded components to be displaced in the opposite first and second directions out of the plane of the busbar upon the mechanical impact loading on the busbar.

2. The battery assembly of claim 1, wherein the anode terminal and the cathode terminal are located on the same side of each of the at least two battery cells.

3. The battery assembly of claim 1, wherein the anode terminal and the cathode terminal are located on oppositely disposed sides of each of the at least two battery cells and the orientation of the at least two battery cells are reversed in the battery assembly.

4. The battery assembly of claim 1, wherein the battery assembly is a granular battery assembly.

5. The battery assembly of claim 1, wherein the battery assembly is a topologically interlocked battery assembly.

6. The battery assembly of claim 5, wherein the at least two battery cells are truncated tetrahedron-shaped battery cells.

7. A method of reducing the likelihood of an overcharge of the battery assembly of claim 1, the method comprising:
    subjecting the battery assembly to a mechanical impact load so that the busbar interrupts the flow of electrical current between the anode of the first battery cell and the cathode of the second battery cell in response to the mechanical impact load.

8. The method of claim 7, wherein the anode terminal and the cathode terminal are located on the same side of each of the at least two battery cells.

9. The method of claim 7, wherein the anode terminal and the cathode terminal are located on oppositely disposed sides of each of the at least two battery cells and the orientation of the at least two battery cells are reversed in the battery assembly.

10. The method of claim 7, wherein the battery assembly is a granular battery assembly.

11. The method of claim 7, wherein the battery assembly is a topologically interlocked battery assembly.

12. The method of claim 11, wherein the at least two battery cells are truncated tetrahedron-shaped battery cells.

13. A current interrupt device for use in a battery assembly comprising at least two battery cells, the current interrupt device comprising:
    a busbar configured to electrically connect an anode terminal of a first of the at least two battery cells and a cathode terminal of a second of the at least two battery cells to enable electrical current to flow between the anode and cathode terminals, the busbar comprising a planar portion that lies in a plane and comprises first and second cladded components that are coplanar and have respective ends that are bonded together at a continuous interface formed by and between the first and second cladded components, the continuous interface being configured such that, upon a mechanical impact loading on the busbar, the ends of the first and second cladded components are displaced in opposite first and second directions, respectively, out of the plane of the busbar and interrupt the flow of electrical current between the anode terminal of the first battery cell and the cathode terminal of the second battery cell in response to a mechanical impact load,
    wherein the end of the first cladded component comprises aluminum cladding and the end of the second cladded component comprises copper cladding,
    wherein the continuous interface is planar and disposed at an oblique angle to the plane of the busbar, and the oblique angle causes the ends of the first and second cladded components to be displaced in the opposite first and second directions out of the plane of the busbar upon the mechanical impact loading on the busbar.

* * * * *